(12) United States Patent
Guan

(10) Patent No.: US 10,088,095 B2
(45) Date of Patent: Oct. 2, 2018

(54) FAST MOUNTING AND POSITIONING FASTENER

(71) Applicant: Minghao Guan, Changzhou (CN)

(72) Inventor: Minghao Guan, Changzhou (CN)

( * ) Notice: Subject to any disclaimer, the term of this patent is extended or adjusted under 35 U.S.C. 154(b) by 0 days.

(21) Appl. No.: 15/444,336

(22) Filed: Feb. 28, 2017

(65) Prior Publication Data

US 2018/0180217 A1 Jun. 28, 2018

(30) Foreign Application Priority Data

Dec. 27, 2016 (CN) .................... 2016 2 1444129 U

(51) Int. Cl.
| | | |
|---|---|---|
| *F16M 11/04* | (2006.01) | |
| *F16B 5/12* | (2006.01) | |
| *F24C 15/02* | (2006.01) | |
| *G09F 7/18* | (2006.01) | |
| *F16B 2/24* | (2006.01) | |
| *F16M 11/22* | (2006.01) | |

(52) U.S. Cl.
CPC .......... *F16M 11/041* (2013.01); *F16B 2/248* (2013.01); *F16B 5/125* (2013.01); *F24C 15/021* (2013.01); *G09F 7/18* (2013.01); *F16B 5/128* (2013.01); *F16M 11/22* (2013.01)

(58) Field of Classification Search
CPC .... F16B 2/20; F16B 2/24; F16B 2/248; F16B 5/125; F16B 5/128; G09F 7/18; B42F 1/08; F24C 15/021; F16M 11/041
USPC ....... 248/112, 175, 217.2, 218.1, 218.2, 302, 248/303, 316.7; 24/67.3, 67.9, 296, 458, 24/551; 277/630, 637, 640
See application file for complete search history.

(56) References Cited

U.S. PATENT DOCUMENTS

| | | | | | |
|---|---|---|---|---|---|
| 1,105,855 | A | * | 8/1914 | Smith | ..................... F21V 21/08 248/229.16 |
| 1,213,685 | A | * | 1/1917 | Owens | ................... A47G 7/045 248/302 |
| 1,511,597 | A | * | 10/1924 | Fergusson | .............. A63H 19/34 248/175 |
| 2,077,368 | A | * | 4/1937 | Jones | ........................ F16B 2/24 24/296 |
| 2,117,571 | A | * | 5/1938 | Place | ....................... F16B 5/125 24/296 |
| 2,124,252 | A | * | 7/1938 | Lavigne | .................. F16B 5/125 24/296 |

(Continued)

*Primary Examiner* — Jonathan Liu
*Assistant Examiner* — Taylor L Morris
(74) *Attorney, Agent, or Firm* — Gokalp Bayramoglu

(57) ABSTRACT

The present invention relates to a structure of positioning and fastening, particularly to a fast mounting and positioning fastener, including a supporting part located below the clamped object and an upper compressing part located above the clamped object. The supporting part is made by bending metal wire and forming into a shape of plane. One end of the metal wire extends freely to form a first free end, and the other end is a connecting end. The upper compressing part is formed by bending the metal wire as well. The upper compressing part includes a middle part connecting with the connecting end. The middle part extends from the connecting end to a position close to a center of the supporting part. The middle part and the supporting part is located in a same plane and the upper position of the middle part connects with a handheld part.

4 Claims, 3 Drawing Sheets

(56) References Cited

U.S. PATENT DOCUMENTS

| | | | | |
|---|---|---|---|---|
| 2,163,455 | A * | 6/1939 | Van Uum | F16B 5/125 24/289 |
| 2,197,590 | A * | 4/1940 | Place | F16B 5/125 24/296 |
| 2,220,273 | A * | 11/1940 | Place | F16B 5/125 24/626 |
| 2,221,009 | A * | 11/1940 | Van Uum | F16B 5/125 24/296 |
| 2,229,708 | A * | 1/1941 | Tinnerman | F16B 5/125 24/295 |
| 2,254,311 | A * | 9/1941 | Place | F16B 5/125 24/296 |
| 2,255,858 | A * | 9/1941 | Place | F16B 5/125 24/296 |
| 2,267,512 | A * | 12/1941 | Van Uum | F16B 5/125 24/296 |
| 2,389,635 | A * | 11/1945 | Place | F16B 5/0642 24/296 |
| 2,563,121 | A * | 8/1951 | Krach | F16B 5/125 24/292 |
| 2,571,364 | A * | 10/1951 | Hosking | B60R 13/0206 24/296 |
| 2,601,512 | A * | 6/1952 | Gagnier | B60J 10/30 49/492.1 |
| 2,894,301 | A * | 7/1959 | Scott | F16B 5/125 24/291 |
| 2,899,729 | A * | 8/1959 | Garman | F16B 5/125 24/296 |
| 2,970,354 | A * | 2/1961 | Grant | F16B 5/125 24/296 |
| 3,047,919 | A * | 8/1962 | Scott | F16B 5/125 24/292 |
| 3,251,105 | A * | 5/1966 | La Penna | F16B 5/125 24/296 |
| 4,074,885 | A * | 2/1978 | Hacker, Jr. | E04B 9/006 24/326 |
| 4,822,060 | A * | 4/1989 | Moyer | D04B 9/44 126/190 |
| 5,054,728 | A * | 10/1991 | Nigro, Jr. | A47F 5/0823 248/220.41 |
| 5,205,075 | A * | 4/1993 | Moyer | F16B 2/243 49/492.1 |
| 5,490,650 | A * | 2/1996 | Pendergrass | A47F 5/0823 248/220.31 |
| 5,806,149 | A * | 9/1998 | Schultz | F16B 2/248 24/291 |
| 5,915,698 | A * | 6/1999 | James | F24C 15/021 24/296 |
| 5,918,885 | A * | 7/1999 | Radke, II | F24C 15/021 24/458 |
| 6,363,582 | B1 * | 4/2002 | Van Bladel | A44C 3/001 24/67.11 |
| 6,893,025 | B2 * | 5/2005 | Hight, Jr. | B21D 53/36 24/296 |
| 7,137,607 | B2 * | 11/2006 | Hibbs | B62J 11/00 248/112 |
| 8,214,974 | B2 * | 7/2012 | Zhou | F24C 15/021 24/296 |
| 8,601,646 | B2 * | 12/2013 | Wang | F16B 2/248 24/296 |
| 2009/0079141 | A1 * | 3/2009 | Qiang | F16J 15/027 277/650 |
| 2010/0251621 | A1 * | 10/2010 | Donoho | F24C 15/021 49/493.1 |

* cited by examiner

FAST MOUNTING AND POSITIONING FASTENER

CROSS REFERENCE TO RELATED APPLICATIONS

This application claims priority to Chinese Patent Application No. 201621444129.2 filed on Dec. 27, 2016, the entire contents of which are incorporated herein by reference.

TECHNICAL FIELD

The present invention relates to a structure of positioning and fastening, particularly to a fast mounting and positioning fastener.

BACKGROUND

The posters of advertising lightbox generally require a periodic replacement to create greater values. Traditional methods of replacements are tedious and complicated, even a professional needs a long time to complete, and the wrinkles and breakages of the poster paper is unavoidable. Fasteners are generally needed when mounting the advertising posters into the lightboxes. Sometimes a bolt is used for fixation, and sometimes a fixation method of positioning a small plastic hook on an upper position, and applying a metal clip on a lower position, is adopted. However, these methods for fixations are all tedious and complicated. Trademarks made of silk or cloth, even three-dimensional trademarks can be used on some high-grade goods and furniture. These trademarks are generally fixed on the goods by rivets, destroying the integrity of the trademarks and thus not aesthetic. Riveted trademarks may be removed if needed in a destructive way unavoidably. The tools are required when the trademarks are mounted, and it is unavoidable for these tools to bump against the goods. A great deal of energy and material resources are needed to repair the appearance defects caused by bumping, and it is hard to achieve perfection by the repair. Bolts are usually used to fix crash pads of some small devices and thus difficult to be dismounted. Embedded structures are used when sealing strips are required for most of the doors of open-close type, which causes tedious installation and troublesome replacement. These examples have same issues in product processing and replacement process, i.e., it is hard to mount and dismount the fasteners.

SUMMARY OF INVENTION

To solve the defects of hard mounting and dismounting of the fastener in the prior art, the present invention provides a fast mounting and positioning fastener which can be mounted and dismounted quickly.

To solve the technical problems, the technical solutions adopted by the present invention are as below:

A fast mounting and positioning fastener includes a supporting part located below the clamped object and an upper compressing part located above the clamped object. The supporting part is made by bending a metal wire and forming into a planar shape. One end of the metal wire extends freely to form a first free end, and the other end is a connecting end. The upper compressing part is formed by bending the metal wire. The upper compressing part includes a middle part connected with the connecting end. The middle part extends from the connecting end to a position close to a center of the supporting part. The middle part and the supporting part are located in a same plane and an upper portion of the middle part is connected with a handheld part.

Furthermore, the supporting part and the upper compressing part are formed by bending a same metal wire. The supporting part extends inwards naturally to form the middle part, the middle part extends upwards naturally to form the handheld part.

Preferably, the supporting part is olive shaped, and the middle part is located on the length orientation of the olive-shape. The structure of olive-shape is smooth and evasive, and have good bearing ability, such that plays a good supporting role. Because the middle part is located on the length orientation of the olive-shape, the fast mounting and positioning fastener can fasten with a longer distance and the structure is more stable.

Preferably, the shape of the middle part is a straight line. When the straight line is used, the resistance of being stuck in the objects is small, thus less strength is required and the mounting is fast.

Furthermore, the handheld part is made by bending the metal wire and forming a planar shape. The middle part and the handheld part are located in a same plane. The middle part and the handheld part located in the same plane makes it easy to apply force and convenient to operate.

Preferably, the handheld part is a symmetrical structure including apex angle located on a top portion of the symmetrical structure. The two sides of the apex angle are bent inwards to cross each other below the apex angle, a first bottom foot and a second bottom foot extend from the position below the cross point. The first bottom foot is the second free end extending freely, and the second bottom foot connects with the middle part.

Furthermore, the symmetrical center line of the handheld part is perpendicular to the plane where the supporting part is located.

Furthermore, the symmetrical center line of the handheld part passes through the center of the supporting part.

Furthermore, an angle between the plane of handheld part and the plane of supporting part is greater than 0°.

Preferably, the plane of handheld part is perpendicular to the plane of supporting part.

Beneficial Effects (1) The fast mounting and positioning fastener of the present invention can be fast stuck to the object required to be connected with. The supporting part is located on a plane, and can be inserted into a loose construction, which will not cause damages to the appearance and the structure of the object to be connected with. No tool is required, and the installation can be completed by hand.

(2) The dismounting is convenient, and just a little effort is enough to pull out the objects connected with the positioning fastener.

(3) There is a certain supporting force, and the positioning fastener would not loose naturally if the object to be connected with is not teared. If the object need to be installed has a large area, a plurality of positioning fasteners can be used to support the object. The installation is easy, convenient, and durable.

BRIEF DESCRIPTION OF DRAWINGS

The further detailed description of the present invention is provided as below, with reference to the appended drawings and the embodiments.

Wherein, 1. upper compressing part, 10. handheld part, 11. apex angle, 12. first bottom foot, 13. second bottom foot, 14. middle part, 2. supporting part, 21. first free end.

DETAILED DESCRIPTION OF INVENTION

Figure 1:
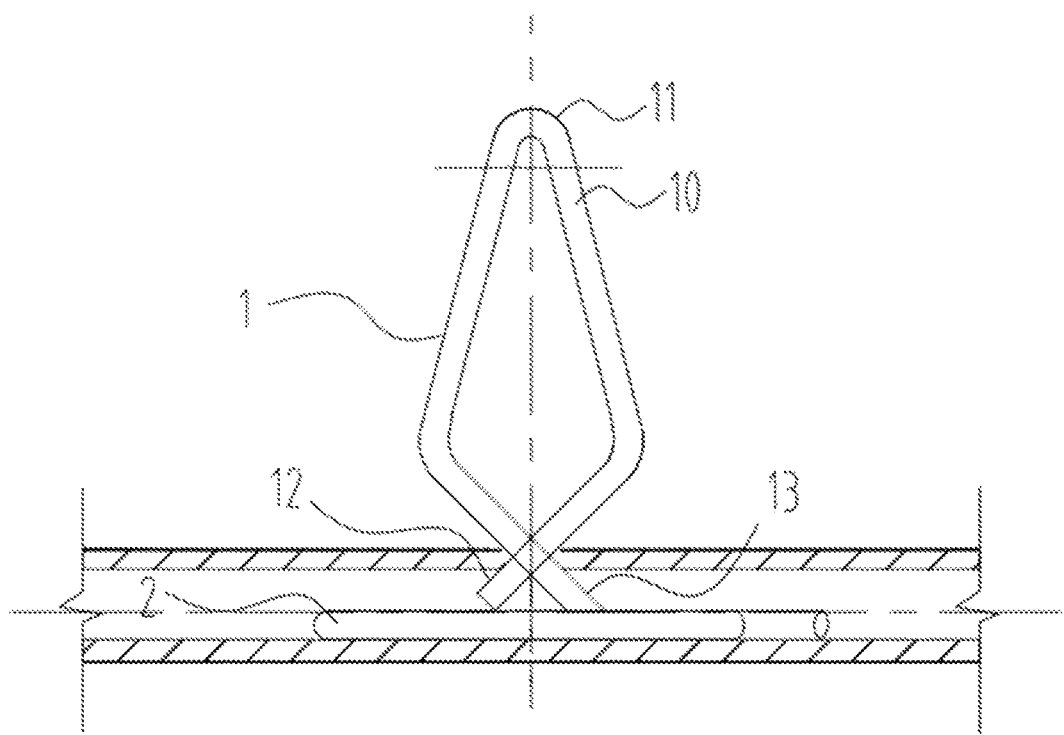
FIG. 1 is the front view of the fast mounting and positioning fastener of the present invention.
Figure 2:
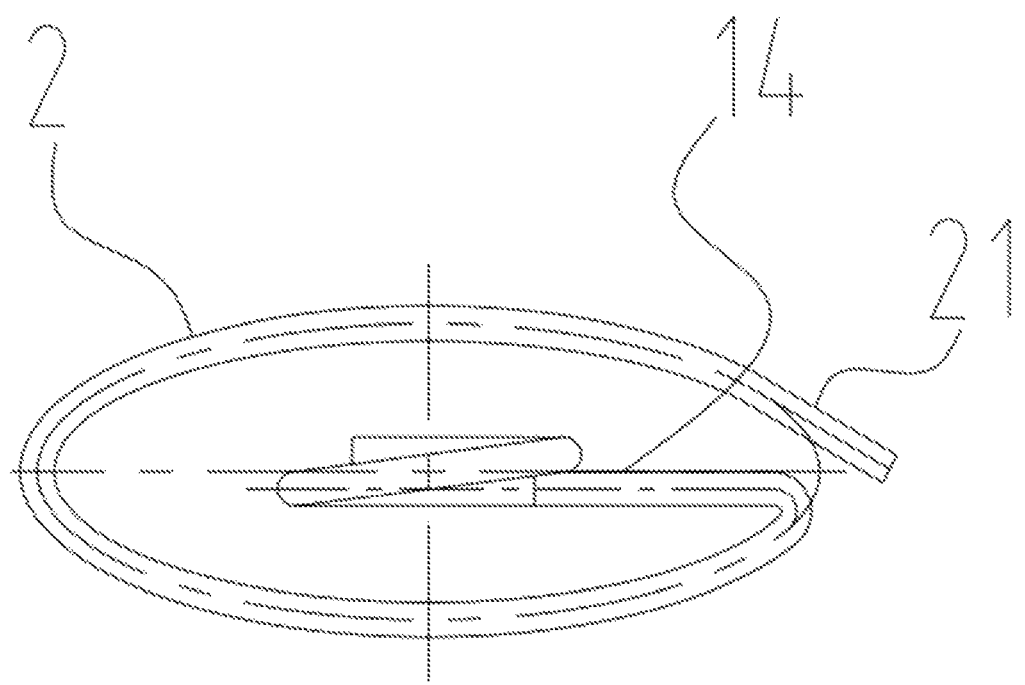
FIG. 2 is the top view of the fast mounting and positioning fastener of the present invention.
Figure 3:
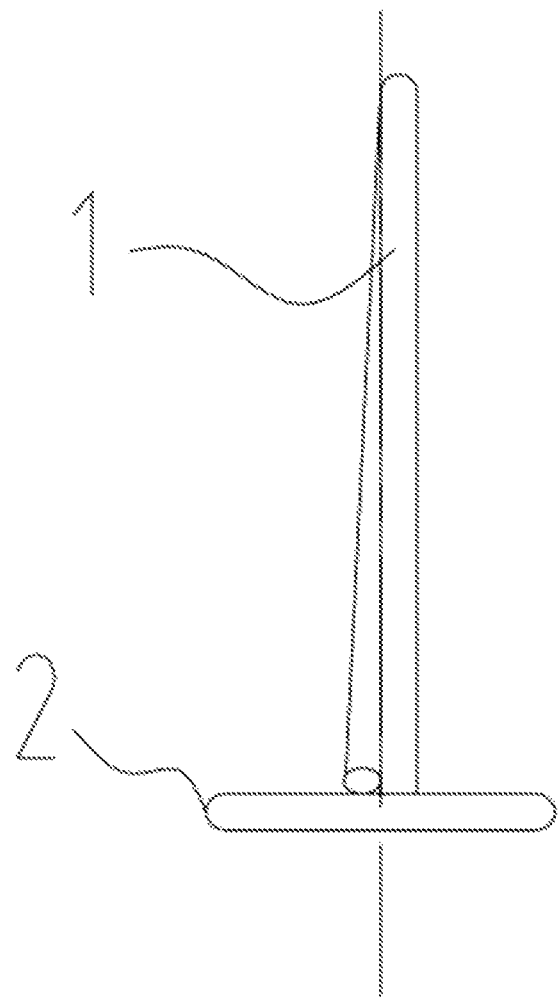
FIG. 3 is the left view of the fast mounting and positioning fastener of the present invention.

As shown in FIGS. 1-3, a fast mounting and positioning fastener includes supporting part 2 located below the clamped object and upper compressing part 1 located above the clamped object. Supporting part 2 is made by bending a metal wire and forming into a planar shape. One end of the metal wire extends freely to form first free end 21, and the other end is a connecting end. Upper compressing part 1 is formed by bending the metal wire as well. Upper compressing part 1 includes middle part 14 connected with the connecting end. Middle part 14 extends from the connecting end to a position close to the center of supporting part 2. Middle part 14 and supporting part 2 are located in a same plane and the upper position of middle part 14 connects with handheld part 10.

Supporting part 2 and upper compressing part 1 are formed by bending a same metal wire. Supporting part 2 extends inwards naturally to form middle part 14, middle part 14 extends upwards naturally to form handheld part 10. In this embodiment, the supporting part 2 is olive shaped, and middle part 14 is located on the length orientation of the olive-shape. The shape of middle part 14 is straight line. When the positioning fastener passes through the outer layer of the object to be connected with and mounts inside the object, because of the existence of supporting part 2 having a shape similar to olive, a large enough supporting force is provided to the object to be connected with. Meanwhile, the installation of the positioning fastener will not cause a deformation to the object to be connected with, such that the integrity and the beauty of the object to be connected with is assured.

Handheld part 10 is made by bending the metal wire and forming into a planar shape. Middle part 14 and handheld part 10 are located in a same plane.

Handheld part 10 is a symmetrical structure including apex angle 11 which is located on the top of the symmetrical structure. The two sides of apex angle 11 are bent inwards to cross each other below apex angle 11, first bottom foot 12 and second bottom foot 13 extend from the position below the cross point. First bottom foot 12 is a second free end that extends freely, and second bottom foot 13 connects with middle part 14.

The symmetrical center line of handheld part 10 is perpendicular to the plane where supporting part 2 locates. The symmetrical center line of handheld part 10 passes through the center of supporting part 2. The angle between the plane of handheld part 10 and the plane of supporting part 2 is greater than 0°. In this embodiment, handheld part 10 is perpendicular to the plane where supporting part 2 locates. That is to say, handheld part 10 and supporting part 2 can be perpendicular, or formed at a certain angle.

When supporting part 2 of the positioning fastener passes through the outer layer of the object to be installed, because of the existence of middle part 14, the positioning fastener can be fixed on the installation position effectively. Middle part 14 not only provides a constraining force to the object to be installed, but also provides a support when fixing the object to a position where the object will be installed, so that the object to be installed closely fits the position where the object will be installed.

To meet the requirements of installation, supporting part 2 and the upper compressing part 1 of the positioning fastener can be made in a different size according to the size of the object that need to be installed and the object to be installed.

To meet the requirements of installation, the angle of the positioning fastener can be made differently, according to the position and the angle of the object that need to be installed and the object to be installed.

The positioning fastener of the present invention has various variations and types. Specific structures and forms may not be limited by the above mentioned. For instance, supporting part 2 of the positioning fastener can also be rhombus, oval or other irregular shapes. Supporting part 2 of the positioning fastener can also be made in other irregular shapes at a small warp angle.

It should be understood that the embodiments described above are only used to explain the present invention, but not to limit the present invention. The obvious modifications and variations derived from the spirit of the present invention also fall into the protection scope of the present invention.

What is claimed is:

1. A fast mounting and positioning fastener, comprising:
a supporting part and an upper compressing part;
wherein the supporting part is made by bending a metal wire into a planar oval shape having a minor axis with a width and a major axis with a length; the supporting part includes an end of the metal wire forming a first free end, where the first free end lies within the width of the minor axis and lies beyond the length of the major axis while being substantially in-line with said major axis, and another end that is a connecting end;
the upper compressing part is formed by bending the metal wire;
the upper compressing part includes a middle part connected to the connecting end; the middle part extends from the connecting end to a position substantially at a center of the supporting part;
the middle part is located in the same plane of the supporting part, when the fast mounting and positioning fastener is in an uninstalled mode and an upper portion of the middle part is connected with a handheld part;
wherein the middle part is oriented along the length of the supporting part;
wherein the handheld part includes an apex angle located on a top portion of the handheld part and a central axis equally bisects the apex angle;
two sides of the apex angle are bent inwards to cross each other at a cross point below the apex angle to form a first bottom foot and a second bottom foot; the first bottom foot is a second free end that extends along a first side of the apex angle after bending without tilt, and the second bottom foot is connected with the middle part; wherein an angle between a plane of the handheld part and the plane of supporting part is an obtuse angle or an acute angle.

2. The fast mounting and positioning fastener of claim 1, wherein the supporting part and the upper compressing part are formed by bending the same metal wire;
the middle part extends inwardly from the supporting part, and the handheld part extends upwardly from the middle part.

3. The fast mounting and positioning fastener of claim 1, wherein a shape of the middle part is a straight line.

4. The fast mounting and positioning fastener of claim 3, wherein the handheld part is made by bending the metal wire and forming into a substantially planar shape.

\* \* \* \* \*